United States Patent
Hung et al.

(10) Patent No.: US 8,643,232 B2
(45) Date of Patent: Feb. 4, 2014

(54) STATOR MANUFACTURING METHOD FOR A MOTOR AND A STATOR MANUFACTURED USING THE SAME

(75) Inventors: Ching-Sheng Hung, Kaohsiung (TW); Kun-Li Hsieh, Kaohsiung (TW); Shu-Hui Chang, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 246 days.

(21) Appl. No.: 13/017,191

(22) Filed: Jan. 31, 2011

(65) Prior Publication Data

US 2012/0139387 A1  Jun. 7, 2012

(30) Foreign Application Priority Data

Dec. 1, 2010 (TW) ................................ 99141802 A (51) Int. Cl.
*H02K 1/04* (2006.01)

(52) U.S. Cl.
USPC .................... 310/43; 310/67 R; 310/216.137; 29/596; 29/597; 29/598

(58) Field of Classification Search
USPC ......................................... 310/43, 216, 67 R
See application file for complete search history.

(56) References Cited

U.S. PATENT DOCUMENTS

| | | | |
|---|---|---|---|
| 6,359,354 B1 | 3/2002 | Watanabe et al. | |
| 6,538,353 B2 | 3/2003 | Marioni | |
| 6,798,091 B2 | 9/2004 | Kudou et al. | |
| 6,828,706 B2 | 12/2004 | Kudo et al. | |
| 6,897,586 B2 * | 5/2005 | Horng et al. | 310/90 |
| 7,117,580 B2 | 10/2006 | Kudou et al. | |
| 7,635,934 B2 | 12/2009 | Zhu et al. | |
| 2007/0145842 A1 * | 6/2007 | Zhu et al. | 310/88 |

FOREIGN PATENT DOCUMENTS

| | | |
|---|---|---|
| CN | 101257231 | 9/2008 |
| CN | 201601538 | 10/2010 |
| TW | 200715690 | 10/1994 |
| TW | I323071 | 2/1996 |
| TW | 200952578 | 6/1999 |
| TW | I247086 | 1/2006 |
| TW | 266469 B | 11/2006 |

* cited by examiner

*Primary Examiner* — Tran Nguyen
*Assistant Examiner* — Leda Pham
(74) *Attorney, Agent, or Firm* — Alan Kamrath; Kamrath IP Lawfirm, P.A.

(57) ABSTRACT

A stator manufacturing method for a motor includes an assembling step coupling a magnetic driving assembly onto an outer circumferential wall of a shaft tube, a mold combining step disposing the shaft tube and the magnetic driving assembly in an intra-cavity of a fixture unit, a glue injecting and forming step injecting a filling glue into the intra-cavity, with the filling glue solidifying into a protective glue coating with which the shaft tube and magnetic driving assembly are coated, a mold removing step removing the fixture unit from the shaft tube, magnetic driving assembly and protective glue coating, and a shaft tube seat coupling step providing a shaft tube seat having an engaging portion and coupling the engaging portion with the shaft tube, allowing the shaft tube, the magnetic driving assembly, the protective glue coating and the shaft tube seat to be coupled together to form a stator for the motor.

20 Claims, 11 Drawing Sheets

STATOR MANUFACTURING METHOD FOR A MOTOR AND A STATOR MANUFACTURED USING THE SAME

BACKGROUND OF THE INVENTION

1. Field of the Invention

The present invention generally relates to a stator manufacturing method and a stator manufactured using the same and, more particularly, to a stator manufacturing method that enables a manufactured stator to be coated with a protective glue coating having a humidity-proof, dustproof or oil-proof function, as well as a stator manufactured using the same.

2. Description of the Related Art

A conventional motor generally includes a stator and a rotor. The stator mainly includes components such as a base, a shaft tube, a coil unit or a circuit board. The rotor is coupled with the stator which, in turn, drives the rotor to rotate. The rotor may be coupled to an impeller which provides a cooling function when the stator drives the rotor to rotate.

However, when the conventional motor operates in a humid or dusty environment, some components of the stator (such as the coil unit or circuit board) are prone to get rusty or damaged easily. Thus, a humidity-proof, dustproof or oil-proof function of the stator is generally required. In light of this, a protection envelope is often used to envelop the stator of the motor for a humidity-proof, dustproof or oil-proof purpose.

Figure 1:
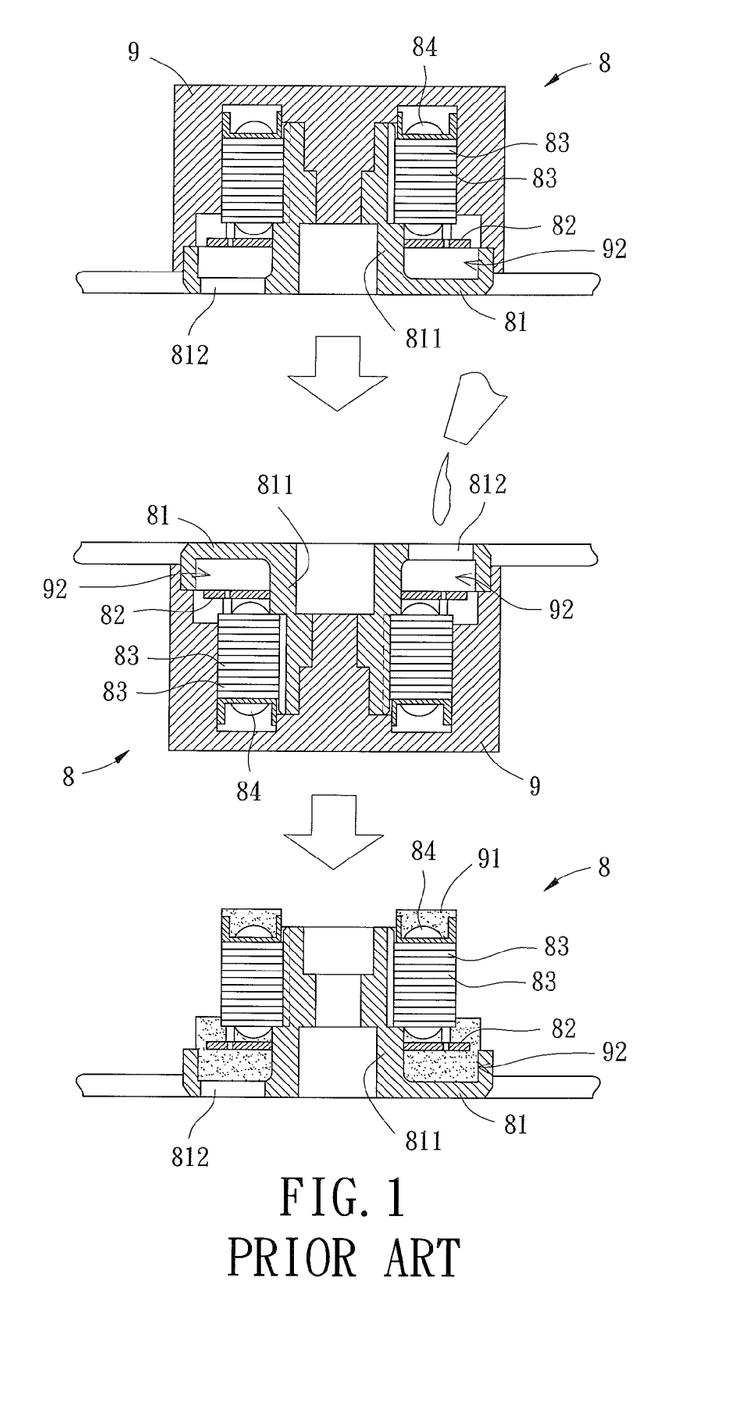
FIG. 1 shows a manufacturing process of a conventional stator manufacturing method.

Referring to FIG. 1, a conventional stator manufacturing method is disclosed by Taiwanese Patent Number I266469 entitled "Waterproof Structure for a Brushless Motor". The conventional stator manufacturing method includes the following steps described below.

First, a shaft tube 811 is disposed on a shaft tube seat 81. The shaft tube 811 has an injecting hole 812. Then, a circuit board 82, a plurality of magnetic pole pieces 83 and a coil unit 84 are then fitted around the shaft tube 811 to form a stator 8.

Second, a mold case 9 is coupled with the shaft tube seat 81 to fit the mold case 9 around the stator 8. Based on this, a waterproof glue is injected into the shaft tube seat 81 via the injecting hole 812. The waterproof glue will solidify into a protection envelope 91 after being heated.

Finally, the mold case 9 is removed from the shaft tube seat 81. As such, the protection envelope 91 can envelop the shaft tube seat 81, shaft tube 811, circuit board 82 and coil unit 84 of the stator 8 to provide a better waterproof function for the stator 8.

However, the stator manufactured by the conventional stator manufacturing method has some problems described below.

First, to inject the waterproof glue into the shaft tube seat 81, the conventional stator manufacturing method requires forming the injecting hole 812 on the shaft tube seat 81 in advance. Based on this, the protection envelope 91 will directly cover one face of the shaft tube seat 81. However, since a filling room 92 is formed between the face of the shaft tube seat 81 and the circuit board 82, it takes a longer time for the waterproof glue in the filling room 92 to solidify into the protection envelope 91. This causes inconvenience during the manufacturing process. Second, since the shaft tube seat 81 is assembled with the shaft tube 811, circuit board 82, magnetic pole pieces 83, coil unit 84 and mold case 9 in advance, the existence of the shaft tube seat 81 will occupy a larger space during the manufacturing process conducted by the conventional stator manufacturing method. For example, when the stator 8 is placed in a drying room to solidify the waterproof glue, the drying room will not be able to accommodate many stators for solidification.

Apart from the inconvenience raised during the manufacturing process of the stator 8, the stator 8 even has some drawbacks such as low structural intensity. This is because the injecting hole 812 formed on the stator 8 will affect the structural intensity of the stator 8. In addition, the protection envelope 91 that envelops the stator 8 is not able to completely envelop the magnetic pole pieces 83, thus limiting the humidity-proof and waterproof functions thereof.

Furthermore, some conventional stators and stator manufacturing methods disclosed by Taiwanese Patent Numbers 1232626, 1280322 and 1323071 have similar problems described above, so they are not described herein again.

Moreover, Taiwanese Patent Publication Number 200715690 discloses a stator structure and a manufacturing method thereof. In this patent, a stator assembly is first disposed in a mold, and a filling is then filled between the mold and the stator assembly to form a protection for the stator assembly. Another Taiwanese Patent Publication Number 200952578 discloses a waterproof and dustproof stator assembly for a cooling fan and a manufacturing method thereof. In this patent, a waterproof and dustproof stator assembly is separately manufactured first. Then, the waterproof and dustproof stator assembly is fixed to a frame or motor base of the cooling fan.

However, the Patent Numbers 200715690 and 200952578 above do not disclose how to securely couple the waterproof and dustproof stator assembly with the motor base of the cooling fan during the manufacturing process. Moreover, in the Publication Number 200952578, the frame or motor base of the cooling fan has a shaft tube that should be forcibly inserted somewhere in the waterproof and dustproof stator assembly. This causes damage to some portions of the waterproof and dustproof stator assembly. As a result, the waterproof and dustproof functions of the waterproof and dustproof stator assembly are weakened. Therefore, it is desired to improve the above conventional stator and manufacturing method thereof

SUMMARY OF THE INVENTION

It is therefore the primary objective of this invention to provide a stator manufacturing method and a stator manufactured using the same, in which the stator manufacturing method performs the assembly operation of a shaft tube seat after a protective glue coating of a stator has formed. Thus, quicker solidification of the protective glue coating is achieved.

It is therefore another objective of this invention to provide a stator manufacturing method and a stator manufactured using the same, in which the stator manufacturing method allows the manufacturing of a stator with a better humidity-proof, dustproof or oil-proof function.

It is yet another objective of this invention to provide a stator manufacturing method and a stator manufactured using the same, in which the stator manufacturing method allows a shaft tube seat to be securely coupled with a predetermined portion of a protective glue coating.

The invention discloses a stator manufacturing method for a motor, which includes an assembling step, a mold combining step, a glue injecting and forming step, a mold removing step and a shaft tube seat coupling step. The assembling step couples a magnetic driving assembly onto an outer circumferential wall of a shaft tube. The mold combining step disposes the shaft tube and the magnetic driving assembly in an intra-cavity of a fixture unit. The glue injecting and forming step injects a filling glue into the intra-cavity, with the filling glue solidifying into a protective glue coating with which the shaft tube and magnetic driving assembly are coated. The mold removing step removes the fixture unit from the shaft tube, magnetic driving assembly and protective glue coating. The shaft tube seat coupling step provides a shaft tube seat having an engaging portion and couples the engaging portion with the shaft tube, allowing the shaft tube, the magnetic driving assembly, the protective glue coating and the shaft tube seat to be coupled together to form a stator for the motor.

Furthermore, the invention discloses a stator of a motor including a shaft tube, a magnetic driving assembly, a protective glue coating and a shaft tube seat. The shaft tube has one end defined as a coupling end. The magnetic driving assembly is coupled onto an outer circumferential wall of the shaft tube. The shaft tube and the magnetic driving assembly are coated with the protective glue coating. The shaft tube seat has an engaging portion and is coupled with the coupling end of the shaft tube.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

In the various figures of the drawings, the same numerals designate the same or similar parts. Furthermore, when the terms "first", "second", "third", "fourth", "inner", "outer", "top", "bottom" and similar terms are used hereinafter, it should be understood that these terms refer only to the structure shown in the drawings as it would appear to a person viewing the drawings, and are utilized only to facilitate describing the invention.

DETAILED DESCRIPTION OF THE INVENTION

Figure 2:
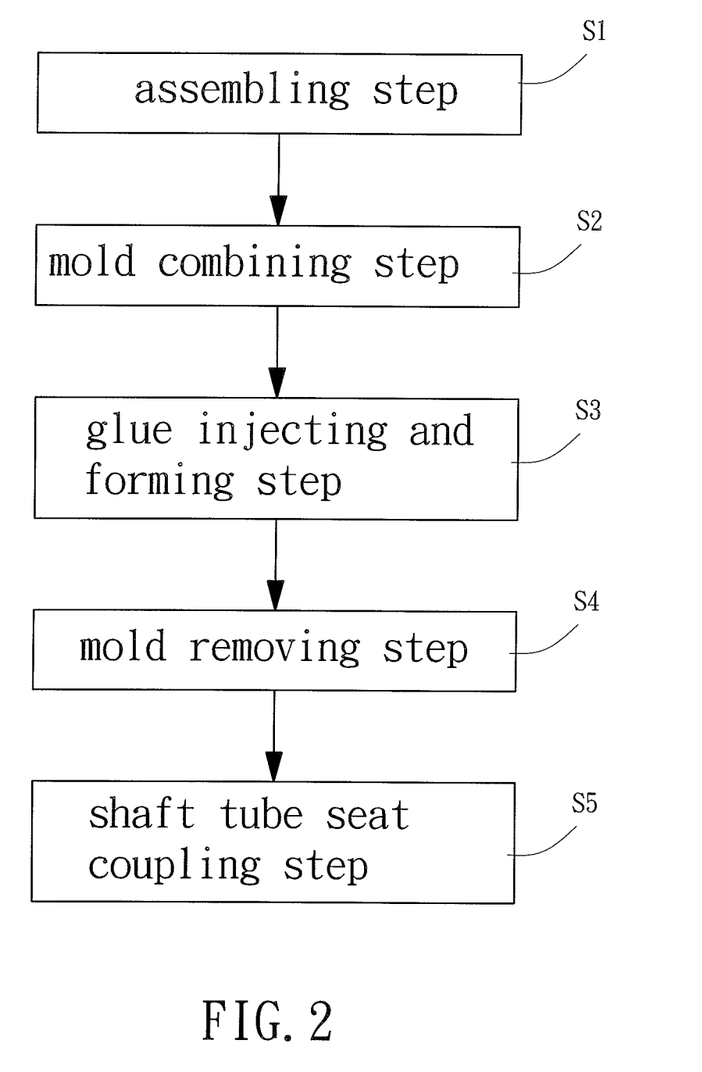
FIG. 2 shows a flowchart of a stator manufacturing method according to a preferred embodiment of the invention.

Referring to FIG. 2, a stator manufacturing method of the invention comprises at least an assembling step S1, a mold combining step S2, a glue injecting and forming step S3, a mold removing step S4 and a shaft tube seat coupling step S5.

Figure 3:
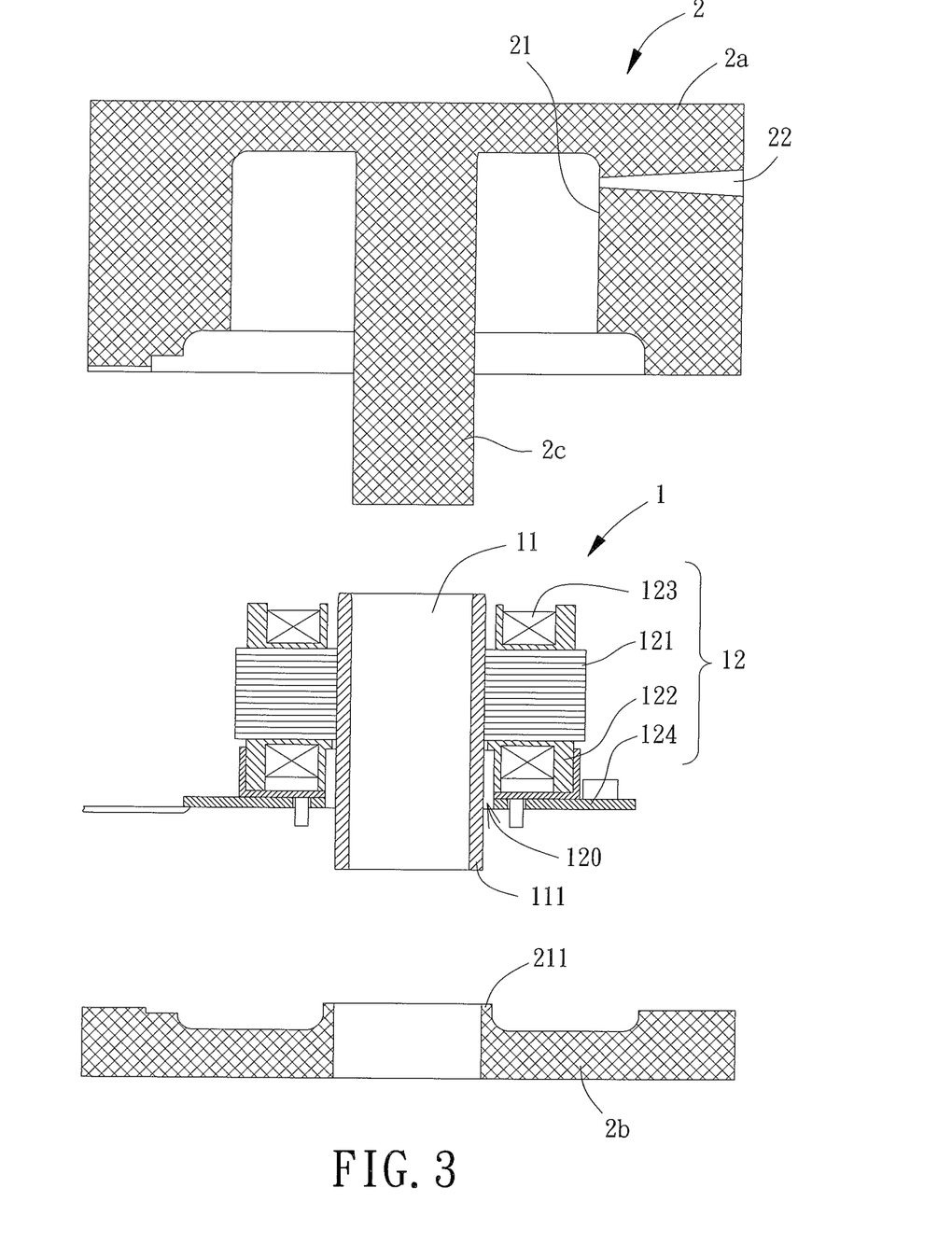
FIG. 3 shows a first manufacturing diagram of a stator manufacturing method according to the preferred embodiment of the invention.

Referring to FIG. 3, the assembling step S1 prepares a shaft tube 11 (which can be made of copper, aluminum, iron or other metals), and couples a magnetic driving assembly 12 onto an outer circumferential wall of the shaft tube 11. As such, an engaging groove 120 is formed between the shaft tube 11 and magnetic driving assembly 12.

As shown in FIG. 3, the shaft tube 11 is a hollow tube having two openings on two ends thereof. However, the shaft tube 11 can also have one end closed. One end of the shaft tube 11 is defined as a coupling end 111 (when the shaft tube 11 has one end closed, the closed end of the shaft tube 11 serves as the coupling end 111). The magnetic driving assembly 12 includes a silicon steel plate unit 121, an insulation assembly 122, a coil unit 123 and a circuit board 124. In this arrangement, the engaging groove 120 is formed at a location between the circumferential wall of the shaft tube 11 and the insulation assembly 122 and the circuit board 124, and adjacent to the coupling end 111. The magnetic driving assembly 12 may be assembled in two different ways, as described below.

In a first case, the silicon steel plate unit 121 and insulation assembly 122 are coupled together first. Then, the coil unit 123 is arranged on a predetermined portion of the insulation assembly 122, and the circuit board 124 is fixed with the insulation assembly 122 and electrically connected to the coil unit 123. Based on this, the silicon steel plate unit 121, insulation assembly 122, coil unit 123 and circuit board 124 are coupled together as a single entity to be coupled with the circumferential wall of the shaft tube 11.

In a second case, the silicon steel plate unit 121 and insulation assembly 122 are coupled together first. Then, the silicon steel plate unit 121 and insulation assembly 122 are coupled with the circumferential wall of the shaft tube 11. Then, the coil unit 123 is arranged on a predetermined portion of the insulation assembly 122, and the circuit board 124 is fixed with the insulation assembly 122 and electrically connected to the coil unit 123. Based on this, the silicon steel plate unit 121, insulation assembly 122, coil unit 123 and circuit board 124 are thus finally coupled together.

Figure 4:
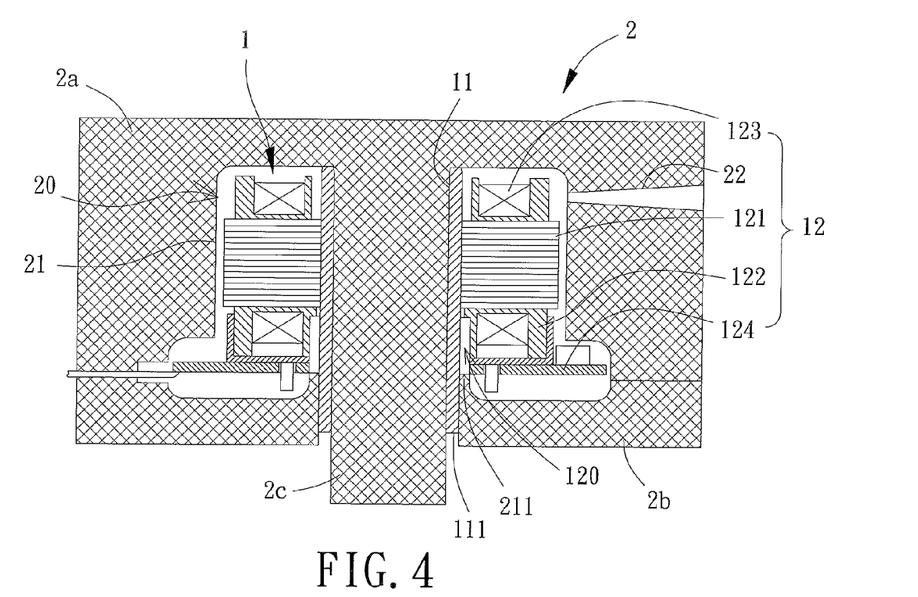
FIG. 4 shows a second manufacturing diagram of a stator manufacturing method according to the preferred embodiment of the invention.

Still referring to FIG. 3, the mold combining step S2 prepares a fixture unit 2 having an intra-cavity 21 and a runner 22 communicating with the intra-cavity 21. The intra-cavity 21 has a blocking portion 211. Based on this, as shown in FIG. 4, the shaft tube 11 and magnetic driving assembly 12 can be coupled together and then disposed in the intra-cavity 21. Based on this, a forming room 20 is formed among an inner wall of the intra-cavity 21, the shaft tube 11 and magnetic driving assembly 12. At the same time, the blocking portion 211 is aligned with the engaging groove 120 to close the engaging groove 120.

As shown in FIG. 4, the fixture unit 2 includes an upper fixture 2a and a lower fixture 2b. The upper fixture 2a and lower fixture 2b can form the intra-cavity 21 after they are combined together. The runner 22 is located in the upper fixture 2a, and the blocking portion 211 is located in the lower fixture 2b. The upper fixture 2a also forms a central fixture 2c. Based on this, as shown in FIG. 4, the upper fixture 2a and lower fixture 2b can be combined together, the shaft tube 11 and magnetic driving assembly 12 can be received in the intra-cavity 21, and the central fixture 2c can be inserted into the shaft tube 11. This ensures the forming room 20, excluding the engaging groove 120 blocked by the blocking portion 211, to be formed among the inner wall of the intra-cavity 21, the shaft tube 11 and the magnetic driving assembly 12.

Figure 5:
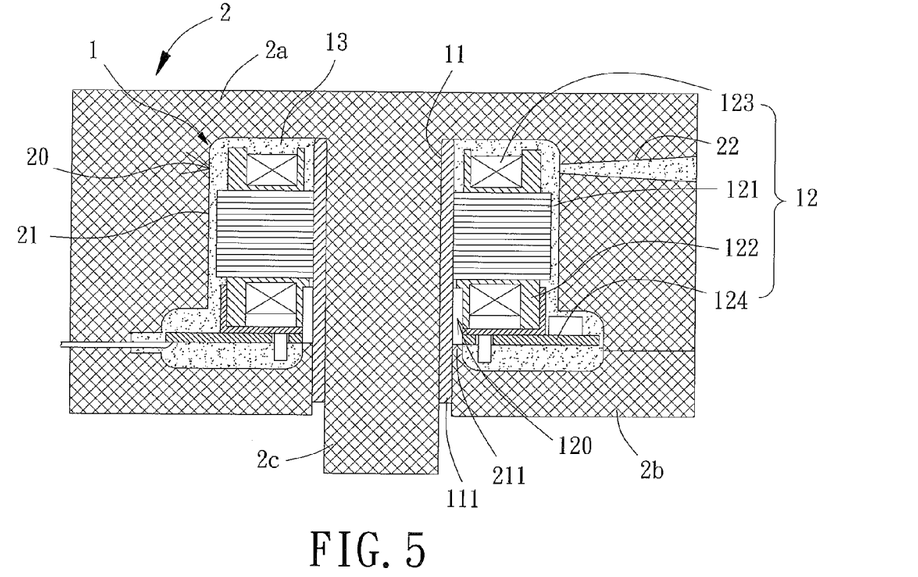
FIG. 5 shows a third manufacturing diagram of a stator manufacturing method according to the preferred embodiment of the invention.

Referring to FIG. 5 also, the glue injecting and forming step S3 injects a filling glue into the intra-cavity 21 of the fixture unit 2. The filling glue may be chosen from materials that have a humidity-proof, dustproof or oil-proof function after solidification, such as resin or silicon gel. The forming room 20 is fully filled with the filling glue. After the filling glue in the forming room 20 has solidified (the required time period for solidification of the filling glue is well-known in the art, so it is not described herein), a protective glue coating 13 with which the shaft tube 11 and magnetic driving assembly 12 are coated is formed.

Figure 6:
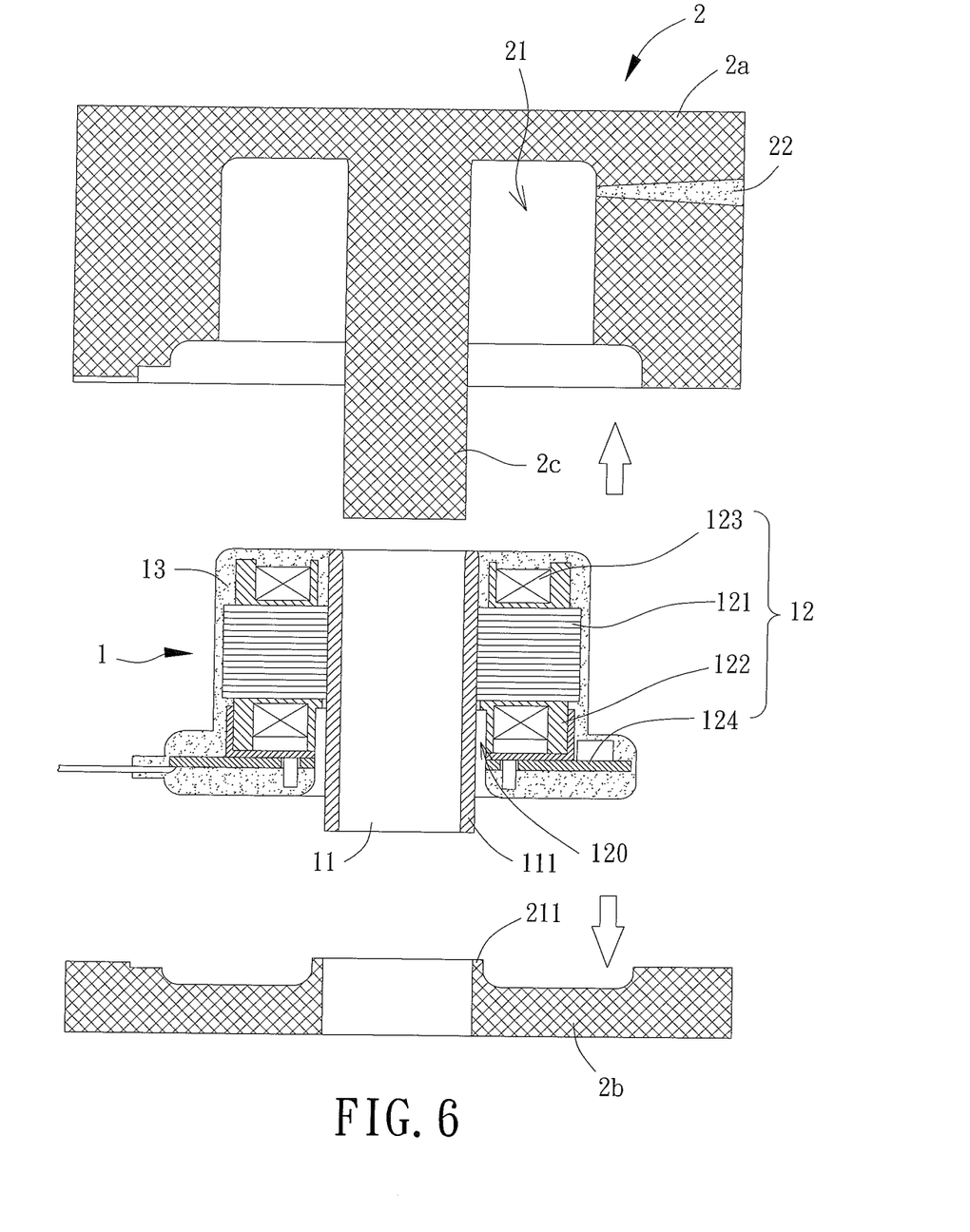
FIG. 6 shows a fourth manufacturing diagram of a stator manufacturing method according to the preferred embodiment of the invention.

Referring to FIG. 6, the mold removing step S4 removes the fixture unit 2 from the shaft tube 11, magnetic driving assembly 12 and protective glue coating 13. In the embodiment, the upper fixture 2a and lower fixture 2b are taken apart first, and the central fixture 2c is then removed from the shaft tube 11 to complete the mold removing step S4.

Figure 7:
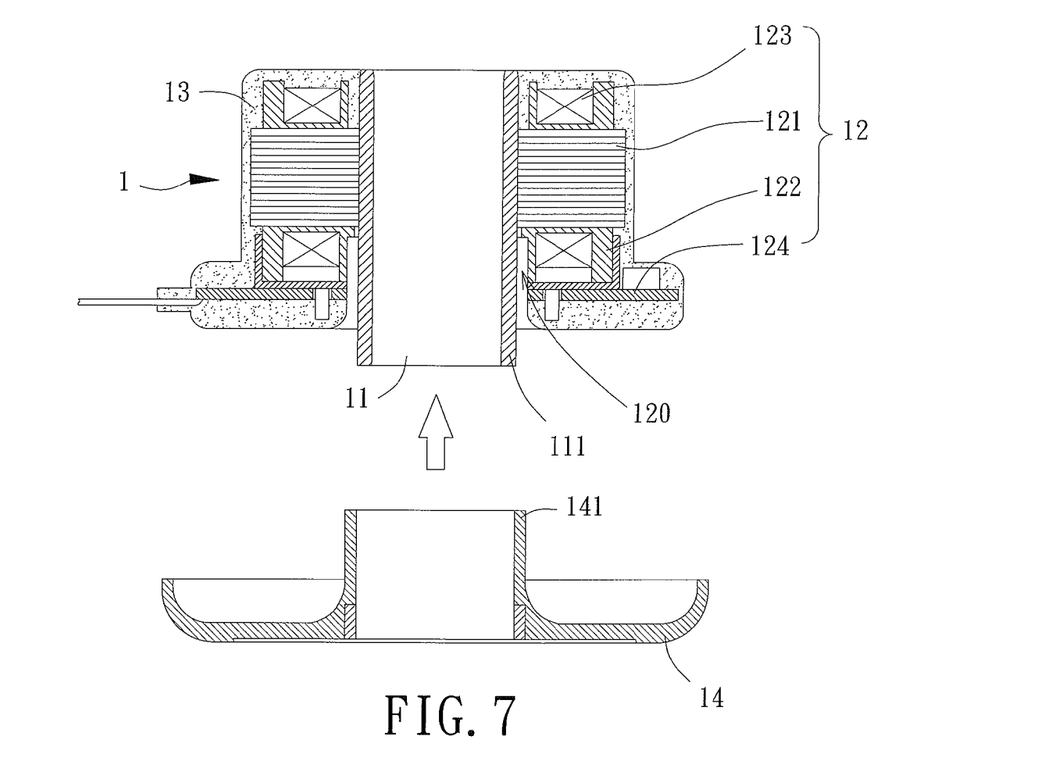
FIG. 7 shows a fifth manufacturing diagram of a stator manufacturing method according to the preferred embodiment of the invention.
Figure 8:
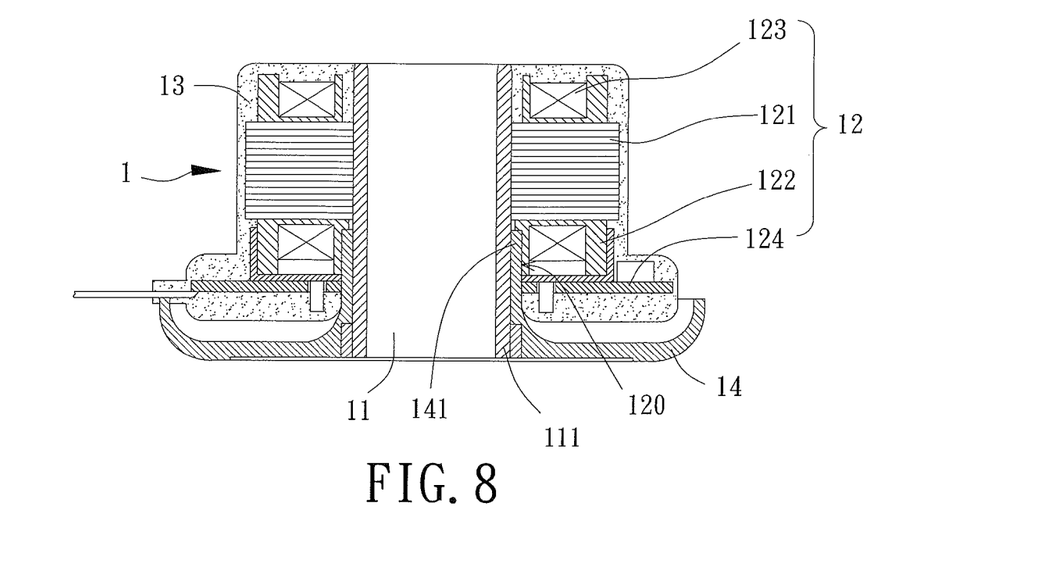
FIG. 8 shows a sixth manufacturing diagram of a stator manufacturing method according to the preferred embodiment of the invention.

Referring to FIGS. 7 and 8, the shaft tube seat coupling step S5 prepares a shaft tube seat 14 having an engaging portion 141. In this arrangement, the engaging portion 141 of the shaft tube seat 14 may be coupled with the engaging groove 120, allowing the shaft tube 11, magnetic driving assembly 12, protective glue coating 13 and shaft tube seat 14 to be coupled together. Thus, the manufacturing of a stator 1 of the invention is completed.

The stator manufacturing method of the invention is characterized in that the shaft tube seat 14 does not have to be coupled with the shaft tube 11 and magnetic driving assembly 12 (only the shaft tube 11 and magnetic driving assembly 12 should be coupled together) when the filling glue is injected into the intra-cavity 21 of the fixture unit 2. In contrast to the conventional stator manufacturing method in FIG. 1, absence of the shaft tube seat 14 avoids the filling room 92 from forming during the manufacturing process of the stator 1, thereby reducing the amount of filling glue required. Thus, cost reduction is achieved. In this mechanism, only the shaft tube 11 and magnetic driving assembly 12 are coated with the filling glue, allowing the filling glue to quickly cool down and solidify into the protective glue coating 13. After the protective glue coating 13 has formed and the fixture unit 2 has been removed, the shaft tube seat 14 is finally coupled with the shaft tube 11, magnetic driving assembly 12 and protective glue coating 13 to form the stator 1. In contrast to the conventional stator manufacturing method shown in FIG. 1, the shaft tube seat 81 has to be coupled with the circuit board 82, magnetic pole pieces 83 and coil unit 84 before the waterproof glue is injected into the shaft tube seat 81. In an undesired case, the filling room 92 would be formed and the waterproof glue filled therein, which would take a longer time to solidify. Overall, the stator manufacturing method of the invention does efficiently reduce the required time period of the solidification process of the filling glue, thus achieving manufacturing convenience. As an advantage, the shaft tube seat 14 is prevented from occupying too much space during the manufacturing process of the stator 1. As another advantage, the protective glue coating 13 won't be damaged during the manufacturing process of the stator 1, as the protective glue coating 13 is applied to the shaft tube 11 and magnetic driving assembly 12 after the shaft tube 11 and magnetic driving assembly 12 are coupled together.

Figure 9:
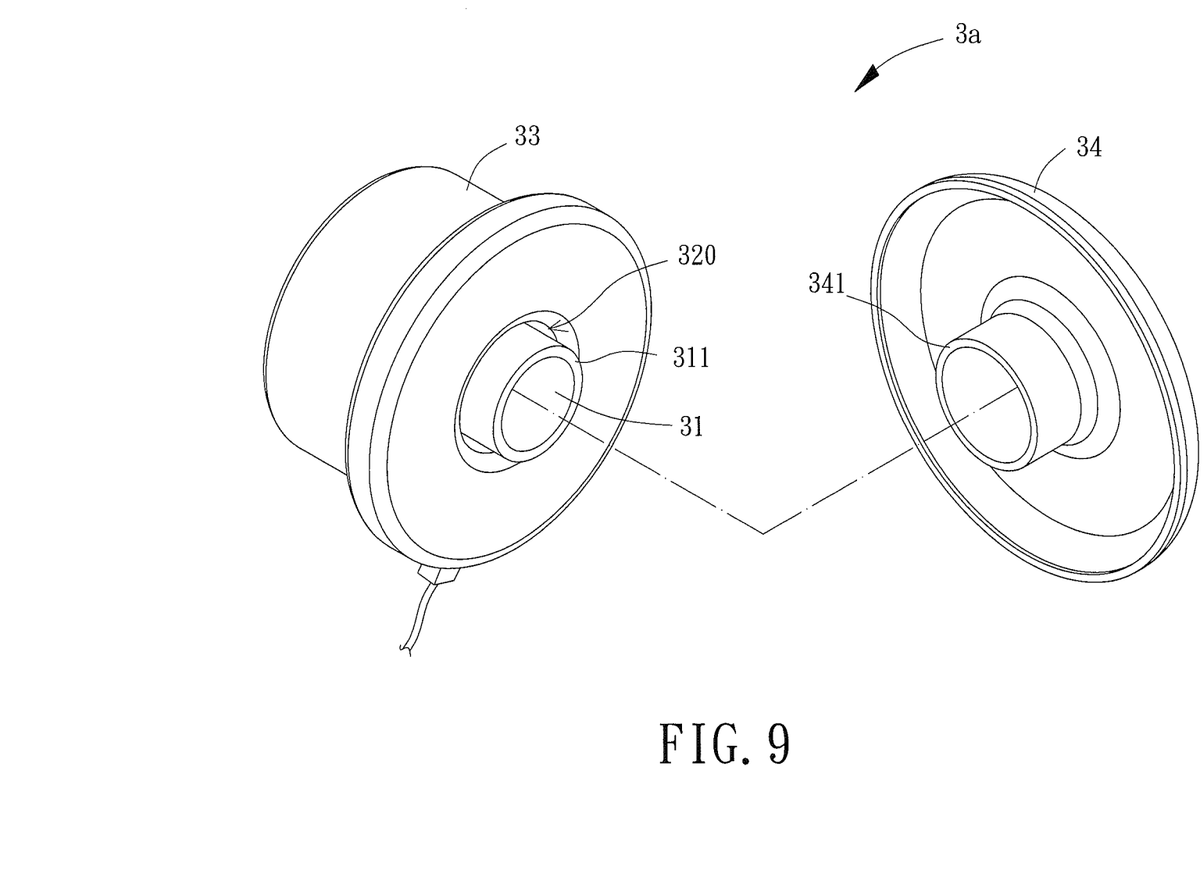
FIG. 9 shows an exploded diagram of a stator according to a first embodiment of the invention.
Figure 10:
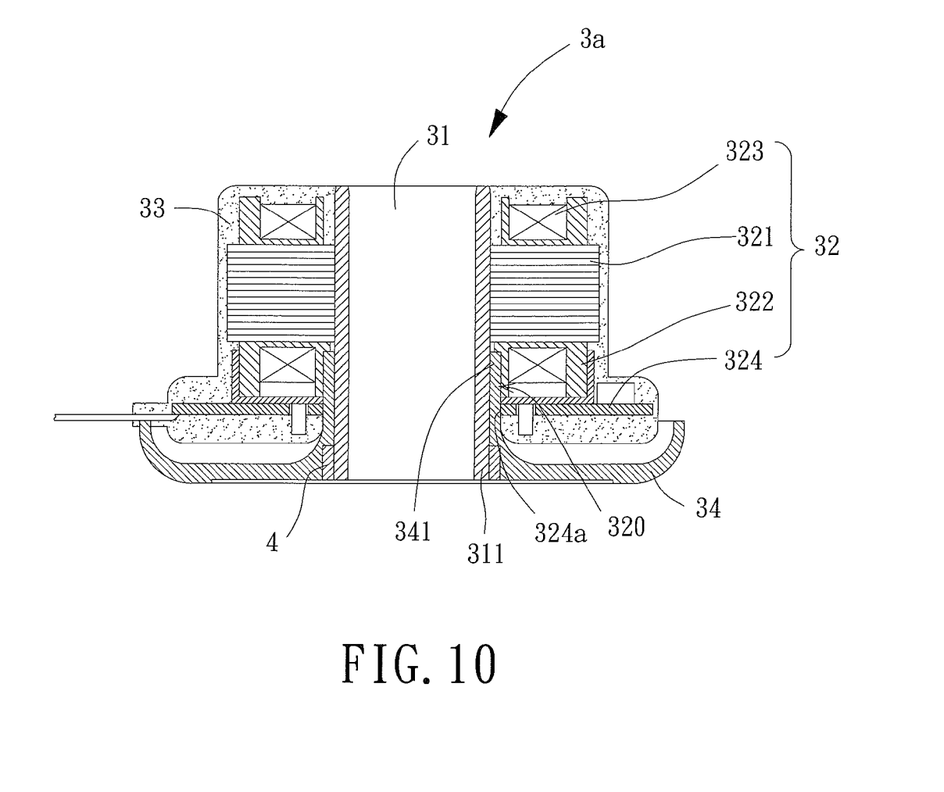
FIG. 10 shows a side cross-sectional view of the stator according to the first embodiment of the invention.

Referring to FIGS. 9 and 10, based on the conception of the stator manufacturing method of the invention described above, a stator 3a including at least a shaft tube 31, a magnetic driving assembly 32, a protective glue coating 33 and a shaft tube seat 34 is disclosed according to a first embodiment of the invention. The shaft tube 31 is coupled with the magnetic driving assembly 32. The shaft tube 31 and magnetic driving assembly 32 are coated with the protective glue coating 33. The shaft tube seat 34 is assembled to the combined structure of the shaft tube 31, magnetic driving assembly 32 and protective glue coating 33.

The shaft tube 31 is a hollow tube having two openings on two ends thereof, with one end thereof defined as a coupling end 311.

The magnetic driving assembly 32 is coupled with an outer circumferential wall of the shaft tube 31 to form an engaging groove 320 between the magnetic driving assembly 32 and shaft tube 31. The engaging groove 320 is adjacent to the coupling end 311 of the shaft tube 31. The magnetic driving assembly 32 can be designed in any structure capable of generating magnetic fields by way of excitation. In this embodiment, the magnetic driving assembly 32 includes a silicon steel plate unit 321, an insulation assembly 322, a coil unit 323 and a circuit board 324. The silicon steel plate unit 321 can be a plurality of silicon steel plates stacked together, or can be in the form of a single entity made of magnetic-conducting metallic powder by way of powder forming. The insulation assembly 322 may be coupled to two ends of the silicon steel plate unit 321 via upper and lower insulation members. The coil unit 323 is arranged on a predetermined portion of the insulation assembly 322. The circuit board 324 is coupled to the insulation assembly 322 and electrically connected to the coil unit 323. The circuit board 324 has a through-hole 324a through which the shaft tube 31 extends. In this arrangement, when the magnetic driving assembly 32 is coupled to the shaft tube 31, the engaging groove 320 is formed between the outer circumferential wall of the shaft tube 31 and the insulation assembly 322 and a circumferential wall of the through-hole 324a of the circuit board 324.

As described above, the shaft tube 31 and magnetic driving assembly 32 are coated with the protective glue coating 33. In the embodiment, the outer circumferential wall of the shaft tube 31 and an outer surface of the magnetic driving assembly 32 are partially coated with the protective glue coating 33. Specifically, as shown in FIG. 10, an outer surface of a combined structure of the shaft tube 31 and magnetic driving assembly 32 is coated with the protective glue coating 33, excluding the portion of the outer surface of the combined structure exposed to the engaging groove 320. In other words, the portion of the outer surface of the combined structure exposed to the engaging groove 320 is not coated with the protective glue coating 33.

The shaft tube seat 34 includes an engaging portion 341 which is inserted into the engaging groove 320 when the shaft tube seat 34 is coupled to the coupling end 311 of the shaft tube 31, allowing the shaft tube seat 34 to be securely coupled with the coupling end 311 of the shaft tube 31. In the embodiment, the engaging groove 320 is in the form of a circular groove, and the engaging portion 341 is in the form of a circular hollow tube seat. The engaging portion 341 is inserted into the engaging groove 320 while tightly fitting to the shaft tube 31. Furthermore, since the engaging portion 341 is generally made of plastic material, an enhancing sleeve 4 such as a copper sleeve may be preferably disposed between the engaging portion 341 and shaft tube 31 to reinforce the coupling between the engaging portion 341 and shaft tube 31.

The stator 3a of the invention is characterized in that the stator 3a may be applied to a motor for driving a rotor of the motor. More importantly, since the engaging portion 341 of the shaft tube seat 34 can be securely coupled with the shaft tube 31, the shaft tube seat 34 can be finally coupled with the combined structure of the shaft tube 31, magnetic driving assembly 32 and protective glue coating 33 after the shaft tube 31 and magnetic driving assembly 32 are coated with the protective glue coating 33. Thus, manufacturing convenience is attained. Moreover, as shown in FIG. 9, the invention may provide a more secure coupling effect between the shaft tube seat 34 and shaft tube 31 by inserting the engaging portion 341 of the shaft tube seat 34 into the engaging groove 320. In particular, the engaging portion 341 may further close the engaging groove 320 to conform to the entire structural outline of the shaft tube 31, magnetic driving assembly 32 and protective glue coating 33. Thus, the magnetic driving assembly 32 is encased in a better manner for an improved humidity-proof, dustproof or oil-proof effect.

Figure 11:
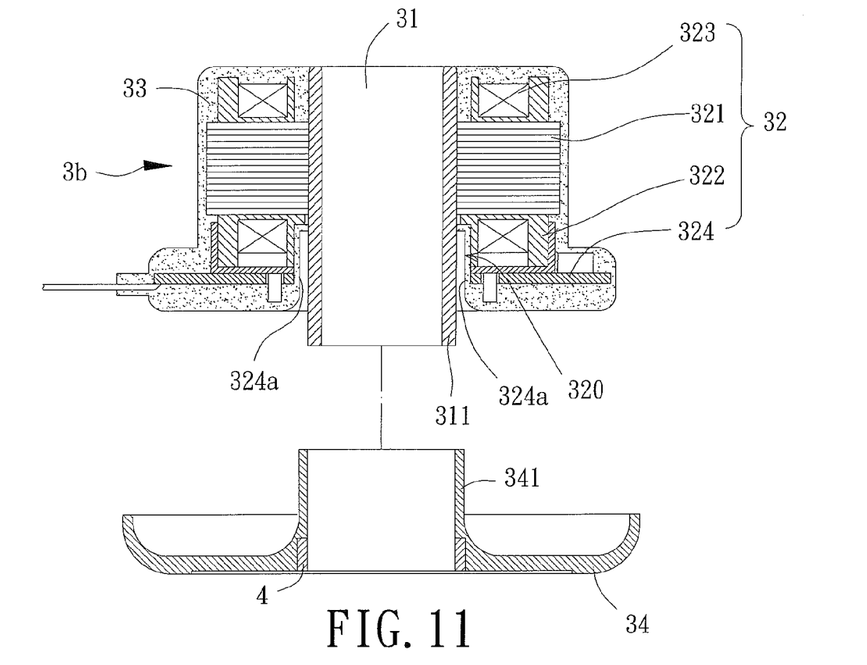
FIG. 11 shows a side cross-sectional view of a stator before assembly, according to a second embodiment of the invention.
Figure 12:
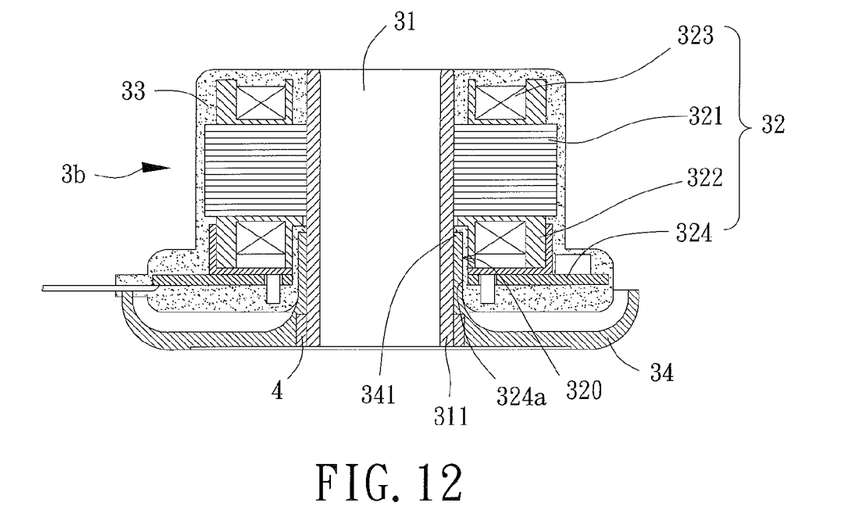
FIG. 12 shows a side cross-sectional view of the stator after assembly, according to the second embodiment of the invention.

Referring to FIGS. 11 and 12, a stator 3b of a second embodiment of the invention is disclosed to have substantial identical structures to the stator 3a of the first embodiment of the invention. The stator 3b of the second embodiment differs from the stator 3a of the first embodiment in that the protective glue coating 33 further extends into the engaging groove 320 in a manner such that the outer surface of the magnetic driving assembly 32 exposed to the engaging groove 320 is coated with the protective glue coating 33. Based on this, even though a gap exists between the engaging portion 341 and engaging groove 320 when the engaging portion 341 is inserted into the engaging groove 320, the stator 3b of the second embodiment still has a better humidity-proof, dustproof or oil-proof function as the outer surface of the magnetic driving assembly 32 exposed to the engaging groove 320 is fully covered by the protective glue coating 33.

Figure 13:
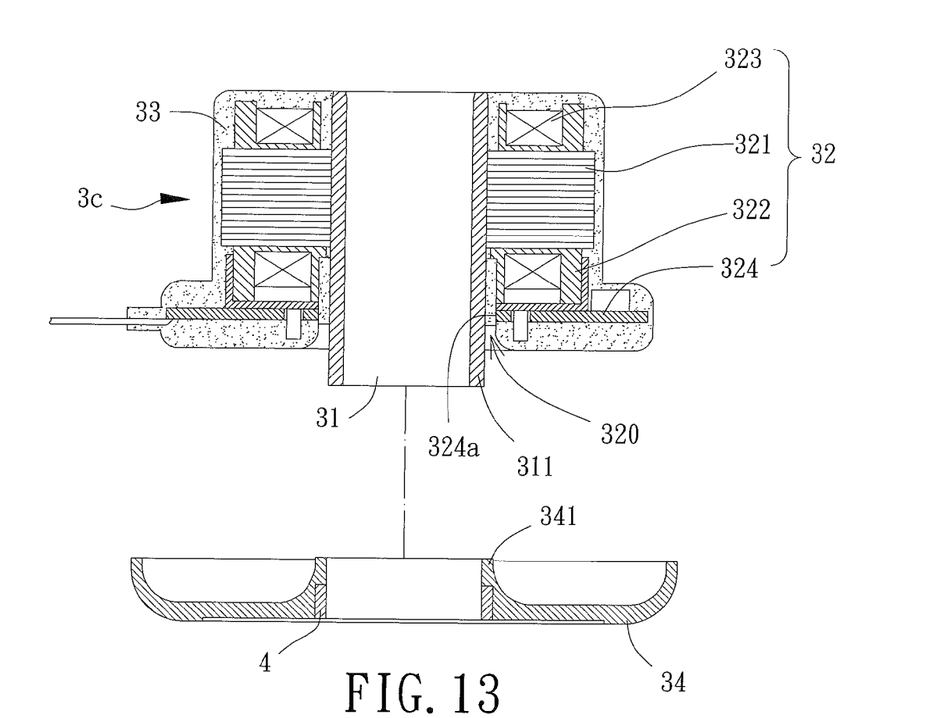
FIG. 13 shows a side cross-sectional view of a stator before assembly, according to a third embodiment of the invention.
Figure 14:
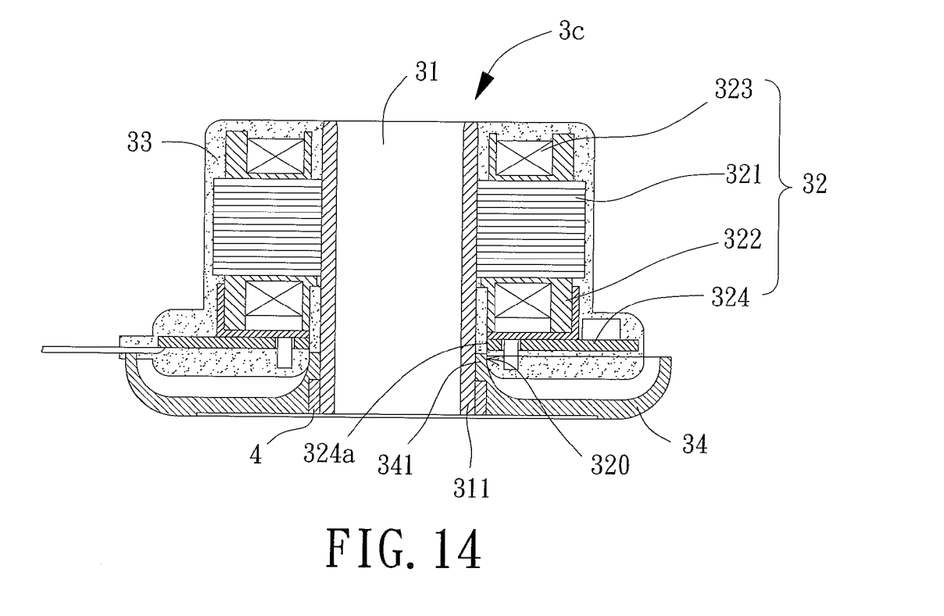
FIG. 14 shows a side cross-sectional view of the stator after assembly, according to the third embodiment of the invention.

Referring to FIGS. 13 and 14, a stator 3c of a third embodiment of the invention is disclosed to have substantial identical structures to the stator 3a of the first embodiment of the invention. The stator 3c of the third embodiment differs from the stator 3a of the first embodiment in that the protective glue coating 33 further extends into the engaging groove 320 in a manner such that the outer surface of the magnetic driving assembly 32 and the outer surface of the shaft tube 31, which are exposed to the engaging groove 320, are both coated with the protective glue coating 33. Thus, the shaft tube 31 and magnetic driving assembly 32 are encased in a better manner.

Figure 15:
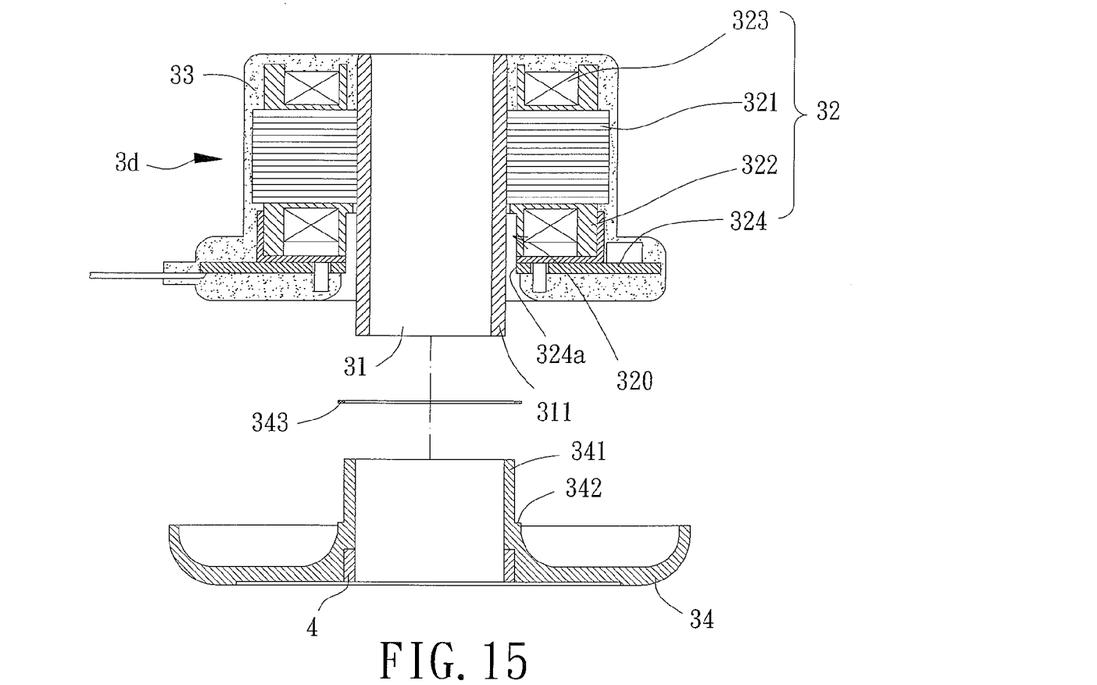
FIG. 15 shows a side cross-sectional view of a stator before assembly, according to a fourth embodiment of the invention.
Figure 16:
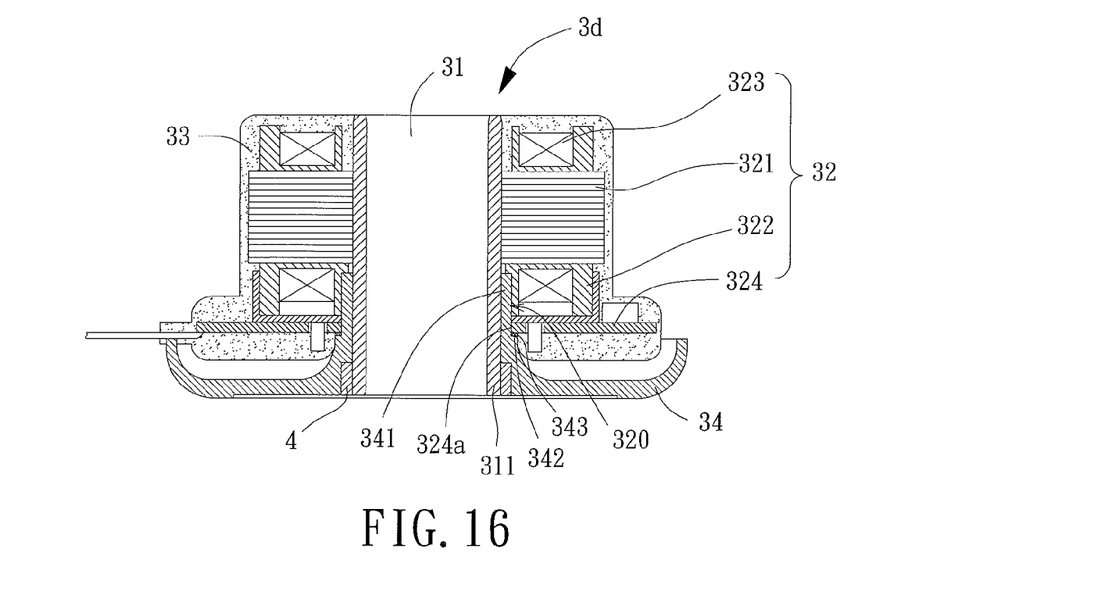
FIG. 16 shows a side cross-sectional view of the stator after assembly, according to the fourth embodiment of the invention.

Referring to FIGS. 15 and 16, a stator 3d of a fourth embodiment of the invention is disclosed to have substantial identical structures to the stator 3a of the first embodiment of the invention. The stator 3d of the fourth embodiment differs from the stator 3a of the first embodiment in that the shaft tube seat 34 further includes a shoulder portion 342 on an outer circumferential wall of the engaging portion 341 thereof for coupling with a sealing pad 343. The sealing pad 343 seals the engaging groove 320 for a better closing effect of the engaging groove 320.

As described above, the stator manufacturing method of the invention and the stator manufactured using the same allow the shaft tube seats 14, 34 to be assembled in a last stage after the protective glue coatings 13, 33 are formed. This allows the protective glue coatings 13, 33 to cool down and solidify more quickly and prevents the shaft tube seats 14, 34 from occupying too much space during the manufacturing process. Thus, less filling glue is used for cost reduction. Also, manufacturing convenience and efficiency are improved.

Furthermore, the magnetic driving assemblies 12, 32 may be efficiently coated with the protective glue coatings 13, 33 for humidity-proof, dustproof or oil-proof purpose.

Furthermore, the magnetic driving assemblies 12, 32 may be efficiently coated with the protective glue coatings 13, 33 for a humidity-proof, dustproof or oil-proof purpose.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A stator of a motor, comprising:
a shaft tube having one end defined as a coupling end;
a magnetic driving assembly coupled onto an outer circumferential wall of the shaft tube;
a protective glue coating with which the shaft tube and the magnetic driving assembly are coated; and
a shaft tube seat having an engaging portion and coupled with the coupling end of the shaft tube,
wherein an engaging groove is formed between the magnetic driving assembly and the shaft tube, the engaging groove is adjacent to the coupling end of the shaft tube, the engaging portion is inserted into the engaging groove, and an outer surface of a combined structure of the shaft tube and the magnetic driving assembly, excluding the portion of the outer surface of the combined structure exposed to the engaging groove, is coated with the protective glue coating.

2. A stator of a motor, comprising:
a shaft tube having one end defined as a coupling end;
a magnetic driving assembly coupled onto an outer circumferential wall of the shaft a protective glue coating with which the shaft tube and the magnetic driving assembly are coated; and
a shaft tube seat having an engaging portion and coupled with the coupling end of the shaft tube,
wherein an engaging groove is formed between the magnetic driving assembly and the shaft tube, the engaging groove is adjacent to the coupling end of the shaft tube, the engaging portion is inserted into the engaging groove, and the protective glue coating extends into the engaging groove in a manner such that an outer surface of the magnetic driving assembly exposed to the engaging groove is further coated with the protective glue coating.

3. A stator of a motor, comprising:
a shaft tube having one end defined as a coupling end;
a magnetic driving assembly coupled onto an outer circumferential wall of the shaft tube;
a protective glue coating with which the shaft tube and the magnetic driving assembly are coated; and
a shaft tube seat having an engaging portion and coupled with the coupling end of the shaft tube,
wherein an engaging groove is formed between the magnetic driving assembly and the shaft tube, the engaging groove is adjacent to the coupling end of the shaft tube, the engaging portion is inserted into the engaging groove, and the protective glue coating extends into the engaging groove in a manner such that an outer surface of the magnetic driving assembly and an outer surface of the shaft tube, which are exposed to the engaging groove, are both coated with the protective glue coating.

4. A stator of a motor, comprising:
a shaft tube having one end defined as a coupling end;
a magnetic driving assembly coupled onto an outer circumferential wall of the shaft tube;
a protective glue coating with which the shaft tube and the magnetic driving assembly are coated; and
a shaft tube seat having an engaging portion and coupled with the coupling end of the shaft tube,
wherein an engaging groove is formed between the magnetic driving assembly and the shaft tube, the engaging groove is adjacent to the coupling end of the shaft tube, the engaging portion is inserted into the engaging groove, the shaft tube seat further includes a shoulder portion on an outer circumferential wall of the engaging portion thereof for coupling with a sealing pad, and the sealing pad seals the engaging groove.

5. The stator of the motor as claimed in claim 4, wherein the magnetic driving assembly includes a silicon steel plate unit, an insulation assembly, a coil unit and a circuit board, the silicon steel plate unit and the insulation assembly are coupled together, the coil unit is arranged on the insulation assembly, and the circuit board is fixed with the insulation assembly and electrically coupled to the coil unit.

6. The stator of the motor as claimed in claim 5, wherein the circuit board has a through-hole through which the shaft tube extends, and the engaging groove is formed between the outer circumferential wall of the shaft tube, the insulation assembly and a circumferential wall of the through-hole of the circuit board.

7. The stator of the motor as claimed in claim 4, wherein the engaging groove is in the form of a circular groove, and the engaging portion is in the form of a circular hollow tube seat tightly fitted to the shaft tube.

8. The stator of the motor as claimed in claim 7, further comprising an enhancing sleeve disposed between the shaft tube seat and the shaft tube.

9. The stator of the motor as claimed in claim 2, wherein the magnetic driving assembly includes a silicon steel plate unit, an insulation assembly, a coil unit and a circuit board, the silicon steel plate unit and the insulation assembly are coupled together, the coil unit is arranged on the insulation assembly, and the circuit board is fixed with the insulation assembly and electrically coupled to the coil unit.

10. The stator of the motor as claimed in claim 9, wherein the circuit board has a through-hole through which the shaft tube extends, and the engaging groove is formed between the outer circumferential wall of the shaft tube, the insulation assembly and a circumferential wall of the through-hole of the circuit board.

11. The stator of the motor as claimed in claim 2, wherein the engaging groove is in the form of a circular groove, and the engaging portion is in the form of a circular hollow tube seat tightly fitted to the shaft tube.

12. The stator of the motor as claimed in claim 11, further comprising an enhancing sleeve disposed between the shaft tube seat and the shaft tube.

13. The stator of the motor as claimed in claim 3, wherein the magnetic driving assembly includes a silicon steel plate unit, an insulation assembly, a coil unit and a circuit board, the silicon steel plate unit and the insulation assembly are coupled together, the coil unit is arranged on the insulation assembly, and the circuit board is fixed with the insulation assembly and electrically coupled to the coil unit.

14. The stator of the motor as claimed in claim 13, wherein the circuit board has a through-hole through which the shaft tube extends, and the engaging groove is formed between the outer circumferential wall of the shaft tube, the insulation assembly and a circumferential wall of the through-hole of the circuit board.

15. The stator of the motor as claimed in claim 3, wherein the engaging groove is in the form of a circular groove, and the engaging portion is in the form of a circular hollow tube seat tightly fitted to the shaft tube.

16. The stator of the motor as claimed in claim 15, further comprising an enhancing sleeve disposed between the shaft tube seat and the shaft tube.

17. The stator of the motor as claimed in claim 1, wherein the magnetic driving assembly includes a silicon steel plate unit, an insulation assembly, a coil unit and a circuit board, the silicon steel plate unit and the insulation assembly are coupled together, the coil unit is arranged on the insulation assembly, and the circuit board is fixed with the insulation assembly and electrically coupled to the coil unit.

18. The stator of the motor as claimed in claim 17, wherein the circuit board has a through-hole through which the shaft tube extends, and the engaging groove is formed between the outer circumferential wall of the shaft tube, the insulation assembly and a circumferential wall of the through-hole of the circuit board.

19. The stator of the motor as claimed in claim 1, wherein the engaging groove is in the form of a circular groove, and the engaging portion is in the form of a circular hollow tube seat tightly fitted to the shaft tube.

20. The stator of the motor as claimed in claim 19, further comprising an enhancing sleeve disposed between the shaft tube seat and the shaft tube.

* * * * *